United States Patent
Hibbert

(10) Patent No.: US 7,817,555 B2
(45) Date of Patent: Oct. 19, 2010

(54) COMPACTING OF FRAMES IN A NETWORK DIAGNOSTIC DEVICE

(75) Inventor: Geoffrey T. Hibbert, San Jose, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 658 days.

(21) Appl. No.: 11/675,044

(22) Filed: Feb. 14, 2007

(65) Prior Publication Data
US 2007/0189174 A1    Aug. 16, 2007

Related U.S. Application Data

(60) Provisional application No. 60/773,516, filed on Feb. 14, 2006, provisional application No. 60/779,198, filed on Mar. 3, 2006.

(51) Int. Cl.
*H04L 12/26* (2006.01)
(52) U.S. Cl. .................. 370/235; 370/503; 370/528
(58) Field of Classification Search .......... 370/235, 370/503, 528
See application file for complete search history.

(56) References Cited

U.S. PATENT DOCUMENTS

| | | | | |
|---|---|---|---|---|
| 5,479,653 A | * | 12/1995 | Jones | 714/5 |
| 5,590,122 A | * | 12/1996 | Sandorfi et al. | 370/394 |
| 6,901,072 B1 | * | 5/2005 | Wong | 370/389 |
| 2004/0054776 A1 | * | 3/2004 | Klotz et al. | 709/224 |
| 2004/0205288 A1 | * | 10/2004 | Ghaffari et al. | 711/100 |
| 2006/0047908 A1 | * | 3/2006 | Chikusa et al. | 711/114 |
| 2007/0153832 A1 | * | 7/2007 | Walsh | 370/474 |
| 2008/0240093 A1 | * | 10/2008 | Morad et al. | 370/389 |
| 2009/0044112 A1 | * | 2/2009 | Basso et al. | 715/706 |

* cited by examiner

*Primary Examiner*—Huy D Vu
*Assistant Examiner*—Amy Haspel
(74) *Attorney, Agent, or Firm*—Matthew A. Pequignot; Pequignot + Meyers LLC

(57) ABSTRACT

A network diagnostic component that is placed in-line between two nodes in a network to reorder or compact a data frame to allow the network diagnostic component to interpret the data frame. The network diagnostic component receives a network data frame from the first node for communication with the second node. The network data frame may include a plurality of data units interspersed with one or more non-data units that interrupt the proximity and flow of the data units. The network diagnostic component then reorders the data frame by removing or moving at least some of the non-data units that are interspersed with the plurality of data units. The reordered network data frame may then be interpreted by other components of the network diagnostic component.

12 Claims, 5 Drawing Sheets

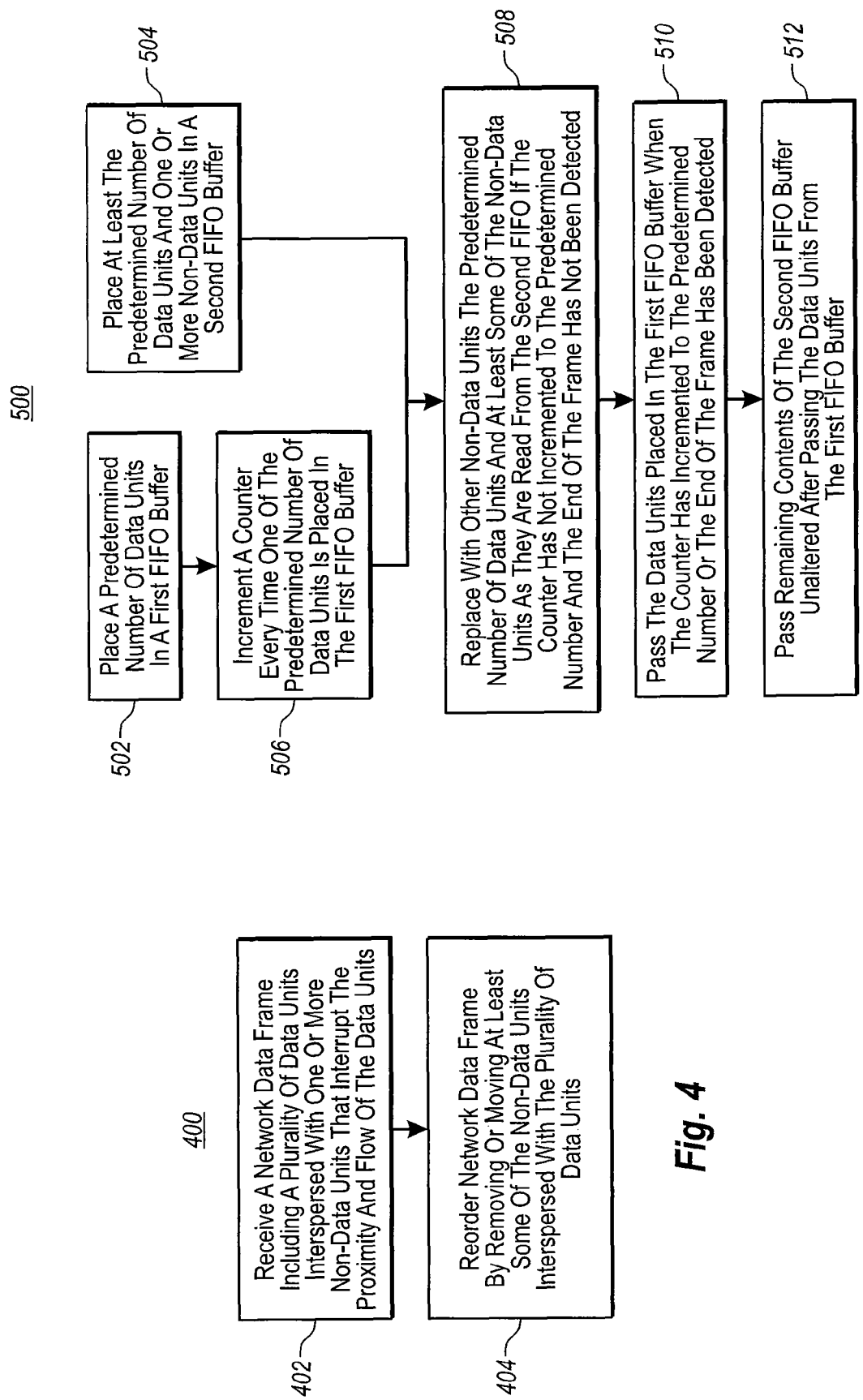

COMPACTING OF FRAMES IN A NETWORK DIAGNOSTIC DEVICE

CROSS-REFERENCE TO RELATED APPLICATIONS

This application claims the benefit of U.S. Provisional Application No. 60/773,516, filed Feb. 14, 2006, and U.S. Provisional Application No. 60/779,198, filed Mar. 3, 2006, both of which are incorporated herein by reference in their entirety.

BACKGROUND

Computer and data communications networks continue to proliferate due to declining costs, increasing performance of computer and networking equipment, and increasing demand for communication bandwidth. Communications networks—including wide area networks ("WANs"), local area networks ("LANs"), metropolitan area networks ("MANs"), and storage area networks ("SANS")—allow increased productivity and use of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has developed to the point that many different physical configurations presently exist. Examples include Gigabit Ethernet ("GE"), 10 GE, Fiber Distributed Data Interface ("FDDI"), Fibre Channel ("FC"), Synchronous Optical Network ("SONET"), Serial Attached SCSI ("SAS"), Serial Advanced Technology Attachment ("SATA"), and Infini-Band networks. These networks, and others, typically conform to one of a variety of established standards, or protocols, which set forth rules that govern network access as well as communications between and among the network resources. Typically, such networks utilize different cabling systems, have different characteristic bandwidths and typically transmit data at different speeds. Network bandwidth, in particular, has been the driving consideration behind much of the advancements in the area of high speed communication systems, methods and devices.

For example, the ever-increasing demand for network bandwidth has resulted in the development of technology that increases the amount of data that can be pushed through a single channel on a network. Advancements in modulation techniques, coding algorithms and error correction have vastly increased the rates at which data can be transmitted across networks. For example, a few years ago, the highest rate that data could travel across a network was at about one Gigabit per second. This rate has increased to the point where data can travel across various networks such as Ethernet and SONET at rates as high as 10 gigabits per second, or faster.

As communication networks have increased in size, speed and complexity however, they have become increasingly likely to develop a variety of problems that, in practice, have proven difficult to diagnose and resolve. Such problems are of particular concern in light of the continuing demand for high levels of network operational reliability and for increased network capacity.

The problems generally experienced in network communications can take a variety of forms and may occur as a result of a variety of different circumstances. Examples of circumstances, conditions and events that may give rise to network communication problems include the transmission of unnecessarily small frames of information, inefficient or incorrect routing of information, improper network configuration and superfluous network traffic, to name just a few. Such problems are aggravated by the fact that networks are continually changing and evolving due to growth, reconfiguration and introduction of new network topologies and protocols. Moreover, new network interconnection devices and software applications are constantly being introduced and implemented. Circumstances such as these highlight the need for effective, reliable, and flexible diagnostic mechanisms.

BRIEF SUMMARY

Embodiments disclosed herein relate to a network diagnostic device or component that is placed in-line between two nodes in a network to compress a random data signal. For example, in one embodiment the network diagnostic component receives a network data frame from the first node for communication with the second node. The network data frame may include a plurality of data units interspersed with one or more non-data units that interrupt the proximity and flow of the data units.

The network diagnostic unit may then reorder the network data frame by removing or moving at least some of the non-data units that are interspersed with the plurality of data units. The reordered network data frame may then be interpreted by other components of the network diagnostic component.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the embodiments disclosed herein. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 4 illustrates a method for a network diagnostic component placed in-line between two nodes to reorder or compact network traffic;

FIG. 5 illustrates a specific method for reordering network traffic; and

DETAILED DESCRIPTION

The embodiments disclosed herein relate to systems and methods for a network diagnostic component to reorder or compact a data frame to allow the network diagnostic component to interpret the data frame. The network diagnostic component receives a network data frame from the first node for communication with the second node. The network data frame may include a plurality of data units interspersed with one or more non-data units that interrupt the proximity and flow of the data units. The network diagnostic component then reorders the data frame by removing or moving at least some of the non-data units that are interspersed with the plurality of data units. The reordered network data frame may then be interpreted by other components of the network diagnostic component.

The embodiments disclosed herein may be practiced in networking systems, including the testing of high speed data transmission systems and components. Embodiments described herein may also be used in other contexts unrelated to testing systems and components and/or unrelated to high speed data transmission. An example networking system will first be described. Then, the operation in accordance with specific embodiments disclosed herein will be described.

Example Networking System

Figure 1:
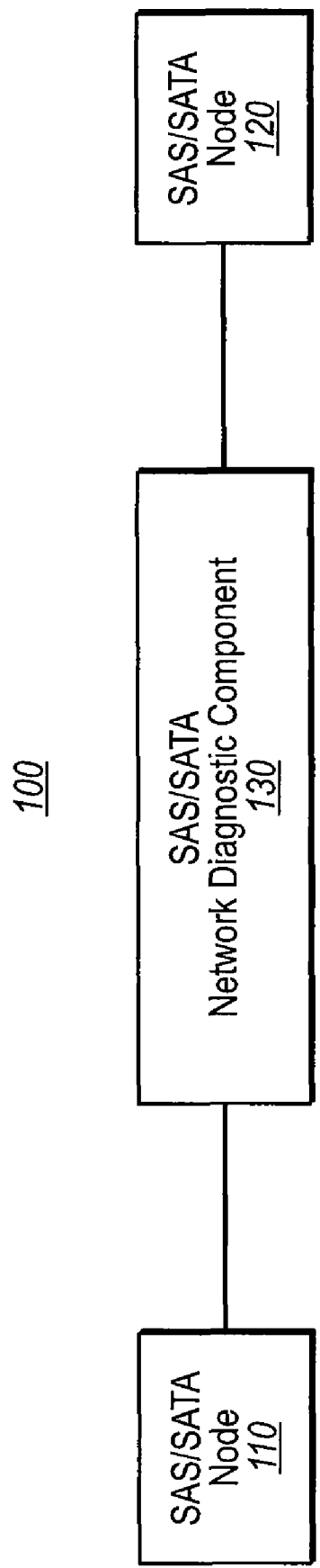
FIG. 1 illustrates a block diagram of a network including a network diagnostic component placed in-line between two nodes.

FIG. 1 is a block diagram of a networking system 100. The networking system 100 may include one or more nodes 110, 120, which communicate with each other via a network. As used herein, a "node" includes, but is not limited to, a server or host; a client or storage device; a switch; a hub; a router; all or a portion of a SAN fabric; a diagnostic device; and any other device or system, or combination thereof, that may be coupled to a network and that may receive and/or monitor a signal or data over at least a portion of a network, that may send and/or generate a signal or data over at least a portion of a network, or both.

In one embodiment, a signal (such as, an electrical signal, an optical signal, and the like) may be used to send and/or receive network messages over at least a portion of a network. As used herein, a "network message" or "network data stream" includes, but is not limited to, a packet; a datagram; a frame; a data frame; a command frame; an ordered set; any unit of data capable of being routed (or otherwise transmitted) through a computer network; and the like. In one embodiment, a network message or data stream may comprise transmission characters used for data purposes, protocol management purposes, code violation errors, and the like.

Also, an ordered set may include, a Start of Frame ("SOF"), an End of Frame ("EOF"), an Idle, a Receiver_Ready ("R_RDY"), a Loop Initialization Primitive ("LIP"), an Arbitrate ("ARB"), an Open ("OPN"), and Close ("CLS")—such as, those used in certain embodiments of Fibre Channel. Of course, any ordered sets and/or any network messages of any other size, type, and/or configuration may be used, including, but not limited to, those from any other suitable protocols.

Nodes may communicate using suitable network protocols, including, but not limited to, serial protocols, physical layer protocols, channel protocols, packet-switching protocols, circuit-switching protocols, Ethernet, Fast Ethernet, Gigabit Ethernet, 10 Gigabit Ethernet, Fibre Channel, Fibre Channel Arbitrated Loop ("FC-AL"), Small Computer System Interface ("SCSI"), High Performance Parallel Interface ("HIPPI"), Serial Attached SCSI ("SAS"), Serial ATA ("SATA"), Serial SCSI Architecture ("SSA"), and the like. In this description and in the claims, protocol is defined to mean at least the speed at which the nodes communicate and the communication rules that are used by the nodes when communicating.

As shown in FIG. 1, the nodes 110, 120 are preferably SAS/SATA nodes. As used herein, "SAS/SATA nodes" includes nodes that are SAS compatible, nodes that are SATA compatible, and nodes that are both SAS compatible and SATA compatible. It will be appreciated, however, that the nodes 110, 120 need not be SATA/SATA nodes and that the nodes 110, 120 may be other types of nodes that are compatible with other types of network protocols. In addition, any reference to a node as being a host or initiator node and another node as being a target node is for illustration only. It is contemplated that nodes 110, 120 can be both host and target nodes as circumstances warrant.

The networking system 100 may comprise a network, network diagnostic system, a network testing system, or the like including network diagnostic components (such as network diagnostic component 130), which may be configured to communicate network messages among nodes. For example, the network diagnostic component 130 may be inserted between the nodes 110, 120 such that network messages sent between the nodes 110, 120 are available to network diagnostic component 130 and/or are routed through the network diagnostic component 130. As used herein, "in-line" denotes that a network diagnostic component is configured to have the network messages sent between two nodes routed to it so that the network messages are available to the network diagnostic component. In some embodiments the network diagnostic component may be directly in-line or it may be indirectly in-line through the use of a tap or like device. In still other embodiments, the network diagnostic component may have the network messages routed to it in any reasonable way.

In further detail, the network diagnostic component 130 may send and receive signals or data. Accordingly, using a signal, the network diagnostic component 130 may receive one or more network messages from a node, send one or more network messages to a node, or both. For example, the network diagnostic component 130 may receive one or more network messages sent between the nodes 110, 120. The network diagnostic component 130 may also retransmit those network messages. In particular, the network diagnostic component 130 may receive network messages sent from the node 110 and then retransmit them to the node 120. Also, the network diagnostic component 130 may receive network messages sent from the node 120 and then retransmit them to the node 110.

Prior to retransmitting these network messages, the network diagnostic component 130 can modify the signal used to transmit the network messages. For example, the network diagnostic component 130 may digitally retime the signal, may modify the content of the messages themselves, or both. It will be appreciated that the network diagnostic component 130 may modify the signal in other desired ways. Because it is not always desirable to have the network diagnostic component 130 modify the signal, the network diagnostic component 130 may be selectively configured to modify (or not to modify) the signal used to transmit the network messages.

The network diagnostic component 130 may also perform a variety of network diagnostic functions using network messages sent between the nodes 110, 120. In performing some of these diagnostic functions, the network diagnostic component 130 may be configured to be passive to the network messages. If desired, the network diagnostic component 130 may receive at least some of the network messages, and may transmit some or all of the received traffic. In performing other diagnostic functions, the network diagnostic component 130 may be configured to modify some or all of the network traffic.

As shown in FIG. 1, the network diagnostic component 130 is preferably a SAS/SATA network diagnostic component. As used herein, "SAS/SATA network diagnostic components" includes network diagnostic components that are SAS compatible, network diagnostic components that are SATA compatible, and network diagnostic components that are both SAS compatible and SATA compatible. It will be appreciated, however, that the network diagnostic component 130 need not be a SAS/SATA network diagnostic component and that the network diagnostic component 130 may be another type of network diagnostic component that is compatible with other types of network protocols. In fact, the network diagnostic component 130 may be configured to perform its functions on any type of network and/or network topology using any number of network protocols.

Frame Comparison in a Network Diagnostic Tool

In some cases, network diagnostic component 130 may include a frame comparator module or other module that may be used to interpret a received network message or data frame. One example of interpretation is detecting whether or not a data frame includes one or more predetermined Data dwords. For example, frame comparators are often designed to allow detection of up to the first 32 Data dwords in a frame. In other words, the frame comparator may detect if a frame contains up to 32 predetermined Data dwords. Of course, the frame comparator may be configured by a user to detect any number less or more than 32 Data dwords if circumstances warrant. Typically, the frame comparator scans an incoming frame (i.e., it interprets the data frame) to determine if the data frame contains the predetermined Data dwords. If a comparison is found, then network diagnostic component 130 may perform other operations on the data frame.

Suppose, for example, that it was predetermined by a user that network diagnostic component 130 interpret the first five Data dwords of a particular data frame. In such a case, as the data frame was received, the frame comparator of network diagnostic component 130 would typically expect that the first five dwords of the data frame would be Data dwords. The frame comparator would lock onto the first five dwords to perform its interpretation operation. In protocols that ensured that the first five dwords were always Data dwords, the interpretation operation would typically succeed as planned.

However, in many protocols, such as SAS and SATA, the network data frame transmitted between nodes 110, 120 may be comprised at least partially of Data dwords and protocol specific primitive dwords (also referred to simply as "primitives") that are often interspersed between the Data dwords in a manner that interrupts the proximity and flow of the Data dwords in the data frame. For example, in SAS and SATA, due to a flow control mechanism, large numbers of primitive dwords may be included in the data frame. In addition, other primitive dwords may be included in the data frame due to rate matching. With such protocols, it is not guaranteed that a Data dword will be in a given position in the data frame. For instance, a data frame may have three Data dwords followed by 20 primitive dwords before the fourth Data dword. In such a case, a frame comparator that was trying to interpret the first five Data dwords would find a primitive dword in the fourth and fifth dword locations instead of an expected Data dword. Accordingly, the interpretation operation would typically fail.

Even if a frame comparator of network diagnostic component 130 was designed to allow for some interruptions in the flow of Data dwords in a data frame, there is still a limit to how large the interruptions may be due to memory constraints in the network diagnostic device. For example, suppose a frame comparator of network diagnostic component 130 was configured to interpret up to the $32^{nd}$ Data dword within the first 70 dwords of the start of the data frame (SOF). If the data frame arrived at network diagnostic component 130 with enough primitive dwords so that the frame comparator could not see the $32^{nd}$ Data dword within the first 70 dwords since the start of the frame, then the frame comparison would fail.

Such a limit of 70 dwords is just an example, and may be imposed, for instance, if the network diagnostic component 130 needed to perform some operation on the start of the frame after the result of the frame comparison was known. Obviously for an in-line device such as network diagnostic component 130 that is passing through traffic between nodes 110 and 120, there is a finite limit of dwords that can be held inside network diagnostic component 130 before those dwords must be forwarded on from one node to the other due to the memory limitations. In addition, this number of dwords would affect the latency of the traffic through network diagnostic component 130, and it is often desirable for this latency to be kept to a minimum for performance reasons.

Accordingly, embodiments described herein relate to systems and methods for the compacting of data frames. The compaction process allows network diagnostic component 130 to reorder a data frame to move or remove any primitive dwords that interrupt the proximity of at least some of the Data dwords in the data frame. This ensures that the Data dwords in the data frame are in locations that may be interpretable by components of network diagnostic component 130. Although the following embodiments will be described using the SAS/SATA protocols, this is by way of example only and should not be used to limit the scope of the appended claims. Other suitable protocols may also be utilized by the embodiments disclosed herein. The embodiments disclosed herein will be explained with reference to FIG. 1 that has already been described and FIG. 2 that will be described below.

Example Network Diagnostic Component

Figure 2:
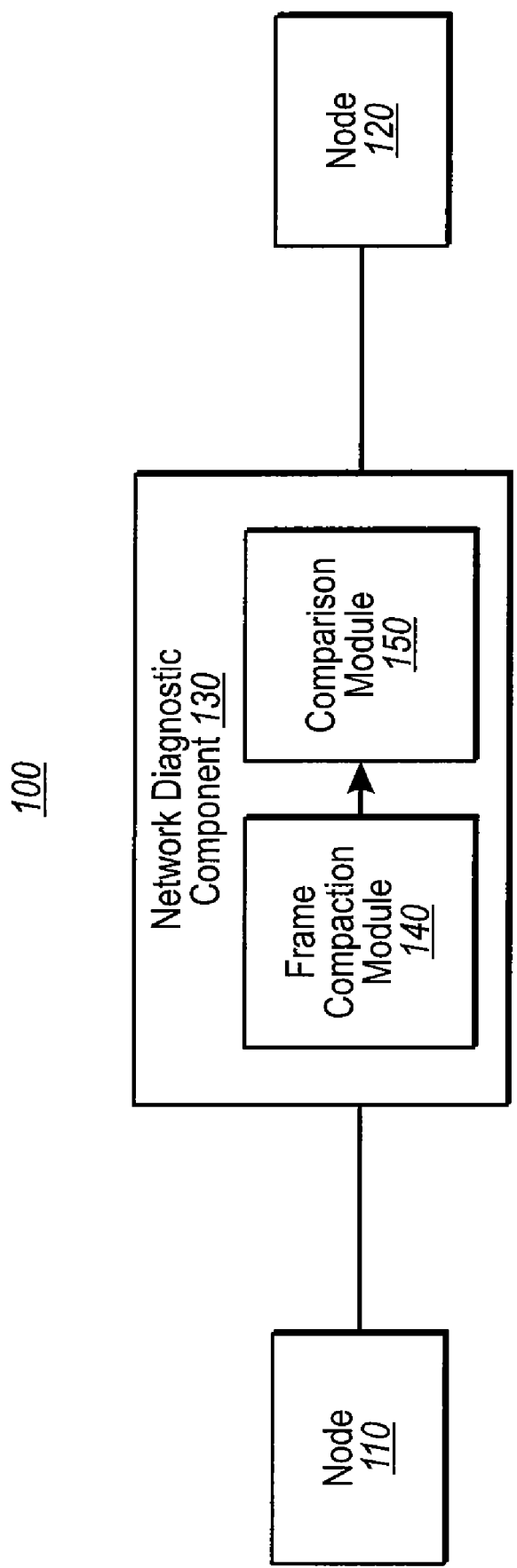
FIG. 2 illustrates a particular embodiment of the network diagnostic component of FIG. 1.

FIG. 2 illustrates a specific embodiment of network 100. Note that the embodiment of FIG. 2 is only one of numerous examples of a network diagnostic component 130 that can be used to implement the embodiments disclosed herein and should not be used to limit the scope of the appended claims. As shown, network diagnostic component 130 includes a frame compaction module 140 and a comparison module 150.

Frame compaction module 140 may be implemented in software, hardware, or any combination of the two. Frame compaction module 140 is configured to receive a data stream or frame including Data dwords interspersed with primitive dwords that act to interrupt the proximity and flow of at least some of the Data dwords. Frame compaction module 140 then performs operations on the data frame to reorder the data frame. The reordering places at least a portion of the Data dwords next to each other by moving or removing any interspersed primitive dwords.

The compacted data stream is then provided to comparison module 150. Comparison module 150 may also be implemented in software, hardware, or any combination of the two, the exact implementation being unimportant to the embodiments described herein. Comparison module 150 is configured to interpret the data frame received from frame compaction module 140 and perform comparison operations on the data frame if circumstances warrant.

As mentioned above, comparison module 150 may be designed to compare a predetermined number of Data dwords within a total number of dwords of the start of a data frame. For example, in one embodiment, comparison module 150 is configured to compare up to the 32nd Data dword within 70 dwords of the start of a data frame. Note that the predetermined number of Data dwords and total dwords may be any reasonable value determined by a user of network diagnostic component 130. Accordingly, any reference to a specific number of Data dwords and total dwords for comparison and compaction purposes is for illustration only.

Example Frame Compaction Module

Figure 3:
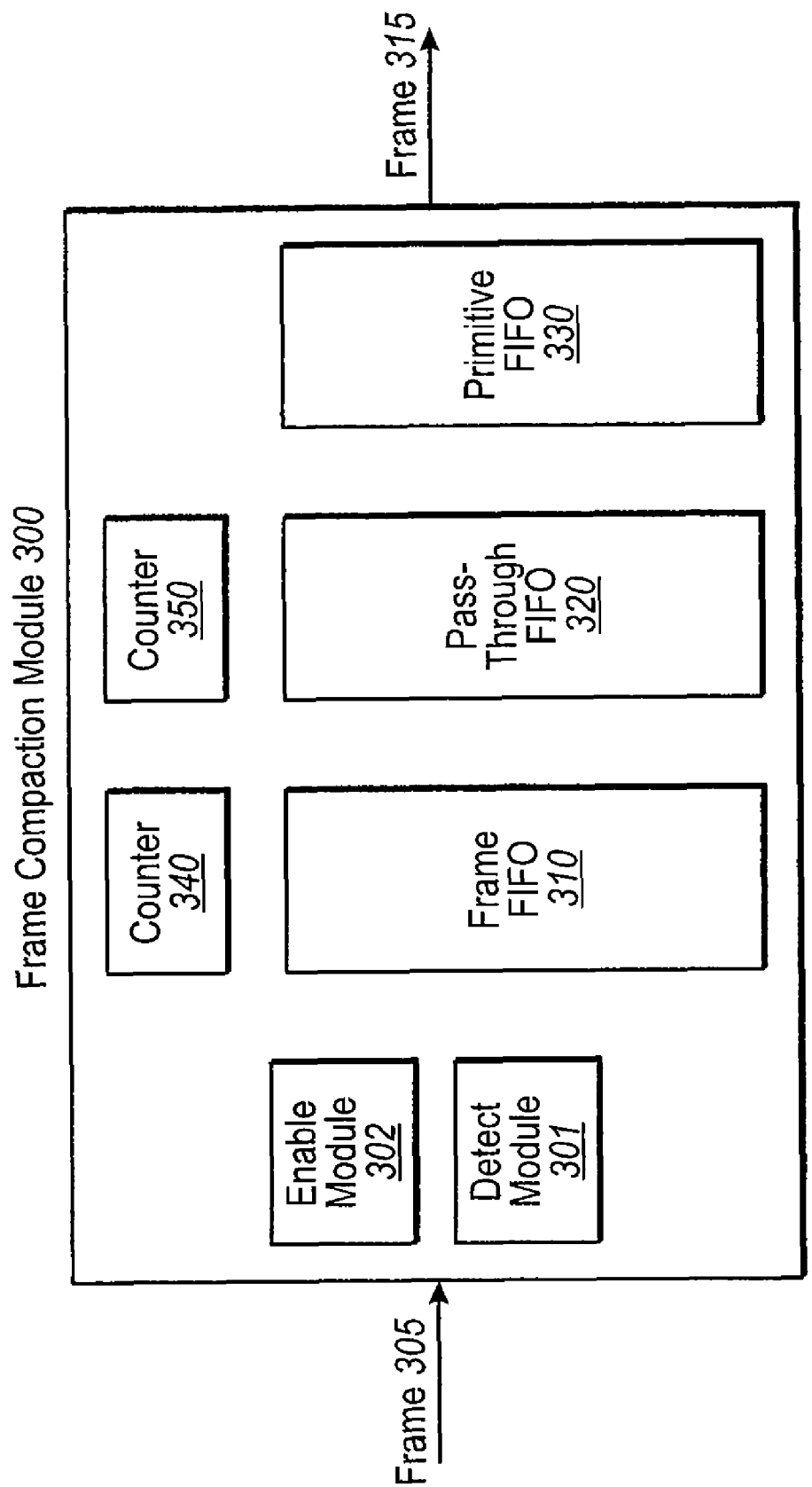
FIG. 3 illustrates a frame compaction module in accordance with embodiments discloses herein.

Referring now to FIG. 3, a specific embodiment 300 of a frame compaction module is illustrated. Frame compaction module 300 may correspond to frame compaction module 140 of FIG. 2, although this is not required. Note that the specific components, component sizes, etc. described in relation to FIG. 3 are for illustration only and should not be used to limit the scope of the embodiments disclosed herein.

Frame compaction module 300 includes a detect module 301. Detect module 301, which may be implemented as software, hardware, or any combination of the two, is configured to receive a data frame 305 from a node, such as nodes 110, 120, and to reorder data frame 305 by placing portions of the data frame 305 in one or more FIFOs as will be explained in more detail to follow. Detect module 301 may also be configured to control the flow of dwords from the FIFOs. In some embodiments, detect module 301 is a state machine.

Frame compaction module 300 also includes a frame FIFO buffer 310 and a pass-through FIFO buffer 320. In one embodiment, frame FIFO 310 is configured to have a depth or size of 32 dwords and pass-through FIFO 320 is configured to have a depth or size of 70 dwords. Note that these FIFO depths are specific to embodiments where comparison module 150 is designed to interpret the $32^{nd}$ Data dword within 70 dwords of the start of the SAS or SATA data frame. The FIFO depths were chosen to ensure that comparison module 150 is able to interpret the frame once it has passed through frame compaction module 300. For this specific example, 70 dwords was chosen to allow for ALIGN and NOTIFY primitives that may be interspersed among the first 32 data dwords of the frame, running in the SAS or SATA protocol at 3 gigabits per second, as these primitives may not be removed from the data frame in order to compress it further. In other embodiments, frame FIFO 310 and pass-through FIFO 320 may have other depths. Accordingly, the embodiments disclosed herein contemplate FIFOs of various depths as operational and design parameters warrant. Note that in embodiments that do not implement the SAS or SATA protocol, there may or may not be dwords that act like ALIGN/NOTIFY dwords in the network traffic.

In some embodiments, frame compaction module 300 may include a primitive FIFO buffer 330. Primitive FIFO 330 may be any required depth. In the present example, primitive FIFO 330 is configured to have a depth of 70 dwords as will be explained in more detail to follow. In other embodiments, primitive FIFO 330 may have other depths as necessary.

Frame compactor 300 further includes a counter 340 and a counter 350. Counters 340 and 350 are configured to count dwords that are placed in frame FIFO 310 and pass-through FIFO 320 respectively. The counters may be implemented as any reasonable counter.

Frame Compaction in SATA

The specific operation of frame compaction module 300 for the SATA protocol in accordance with one embodiment will now be explained with reference to FIG. 3. A data frame 305 including Data dwords interspersed with primitive dwords that interrupt the proximity and flow of the Data dwords is received by detect module 301. Detect module 301 first looks for an SOF (Start of Frame) primitive dword, and then determines if each following dword is a Data dword or a primitive dword.

When an SOF (Start of Frame) primitive dword is detected by detect module 301, it is placed into frame FIFO 310 and counter 340 is started. Simultaneously, the SOF primitive dword is placed in pass-through FIFO 320 and counter 350 is started. The SOF is a primitive dword, but it is considered a Data dword for purposes of the embodiments disclosed herein, as it is needed along with another 31 Data dwords for comparison at comparison module 150. As mentioned previously, in some embodiments, comparison module 150 compares up to 32 Data dwords within the first 70 dwords of data frame 305.

Each Data dword that is detected by detection module 301 after the SOF dword is also simultaneously placed in frame FIFO 310 and pass-through FIFO 320. As the Data dword is placed in each of these FIFOs, the counters 340 and 350 are incremented by one.

In addition, each primitive dword that is detected by detection module 301 is placed only in the pass-through FIFO 320. Some of these primitive dwords cause counter 350 to be incremented by one. Counter 350 keeps track of the total number of non-ALIGN/NOTIFY dwords in the FIFO 320 at any given time. However, any ALIGN/NOTIFY primitive dwords, which have special rate matching and clock retiming functions in the SAS and SATA protocols, are not counted. The ALIGN/NOTIFY primitive dwords are not altered by frame compaction module 140 in some embodiments to preserve the rate matching and clock retiming functions.

This process is continued as both Data dwords and primitive dwords are detected by detection module 301. After 70 dwords, the SOF dword will reach the output of pass-through FIFO 320 as pass-through FIFO 320 has a depth of 70 dwords in the example embodiment. At this point, detection module 301 will check to see how many times counter 340 has incremented. If the end of the frame was already detected, meaning that the frame was shorter than 32 Data dwords, or if counter 340 has incremented to 32 counts, which indicates that there are 32 Data dwords in both FIFOs 310 and 320, the contents of pass-through FIFO 320 are allowed to pass without any reordering as represented by data frame 315 to comparison module 150. In addition, all dwords received after this time are allowed to pass until the frame is complete and the process begins again upon detection of another SOF dword. This is because data frame 315 will meet the design requirement of either ending within 70 dwords of the start of the frame, or having 32 Data dwords within 70 dwords of the start of the frame. As mentioned above, this will allow comparison module 150 to properly interpret frame 315. Frame FIFO 310 is emptied and the counters are reset. In addition, all traffic continues to flow through pass-through FIFO 320, including traffic between frames, in order to preserve the constant unaltered flow of traffic.

On the other hand, if detect module 301 does not find that counter 340 has incremented to 32, which indicates that there are not 32 Data dwords in the first 70 dwords of the frame, then the data frame is not passed from FIFO 320 unaltered. Instead, any time a non-ALIGN/NOTIFY dword reaches the output of pass-through FIFO 320, including the SOF dword, the dword is replaced by a SATA_X_RDY primitive dword, which is then passed to comparison module 150. The SATA_X_RDY primitive dwords are ignored by comparison module 150, which looks for the SOF dword before beginning its interpretation of the data frame. The ALIGN/NOTIFY primitive dwords that reach the bottom of pass-through FIFO 320 are passed through unchanged to preserve rate matching and clock retiming as mentioned previously.

For example, suppose a data frame included an SOF primitive dword followed by a Data dword, an ALIGN/NOTIFY primitive dword, a Data dword, and a non-ALIGN/NOTIFY primitive dword in that order. Note that there may also be any number of additional dwords that follow the non-ALIGN/NOTIFY primitive dword. Further suppose that counter 340 had not incremented to 32 by the time the SOF dword reached the output of FIFO 320. In that case, detect module 301 would cause that a SATA_X_RDY primitive dword replace and be passed instead of the SOF dword. In the next time period, a SATA_X_RDY primitive dword would be sent in place of the first Data dword. The ALIGN/NOTIFY primitive, however, would be passed as described above. Two SATA_X_RDY primitive dwords would also be passed instead of the second Data dword and the non-ALIGN/NOTIFY primitive dword.

Once detect module 301 detects the end of the frame or determines that counter 340 has incremented to 32 (which indicates that there are 32 Data dwords in FIFO 310), then SATA_X_RDY primitive dwords are still sent for each non-ALIGN/NOTIFY dword. This occurs until counter 350, which is no longer incremented but begins to decrement every time a SATA_X_RDY is sent after the end of the frame is detected or counter 340 reaches 32, decrements to the current value of counter 340. This value is 32 unless the end of the frame was detected before counter 340 reached 32. This is done to ensure that after the Data dwords are sent from FIFO 310 as will be explained, the first dword sent from FIFO 320 will be whatever dword comes directly after the end of the frame or Data dword 32 in the original frame 305. In other words, use of counter 350 helps ensure that there is not a gap between the end of the frame or $32^{nd}$ Data dword, and what follows when the contents are sent from the frame FIFO 310. Also, when the end of the frame is detected or counter 340 reaches 32, Data dwords are no longer placed into frame FIFO 310, but all dwords are still placed into pass-through FIFO 320, and counter 340 is no longer incremented.

Once counter 350 has decremented as described, the contents of frame FIFO 310 are sent as frame 315 to comparison module 150. This is performed by sending one Data dword out of frame FIFO 310 each time a non-ALIGN/NOTIFY dword is detected at the output of pass-through FIFO 320. All ALIGN/NOTIFY primitives detected at the bottom of pass-through FIFO 320 are still passed as explained previously. The contents of pass-through FIFO 320 and any new dwords received after this point are also passed through to comparison module 150 as part of data frame 315 after the contents of frame FIFO 310 are passed, and the counters are reset. This process ensures that the required 32 Data dwords, or less if the frame was shorter than 32 dwords, are received by comparison module 150 within 70 dwords of the start of the frame, thus allowing the comparison module 150 to properly interpret the data frame. The frame compaction operation may then be performed anytime a new SOF dword is detected by detection module 301.

Frame Compaction in SAS

The specific operation of frame compaction module 300 for the SAS protocol in accordance with one embodiment will now be explained with reference to FIG. 3. This operation is similar to the operation discussed above in relation to the embodiment described for the SATA protocol. This embodiment, however, utilizes the primitive FIFO 330 as well as the two FIFOs used in the SATA embodiment.

As in the SATA operation, a frame 305 including Data dwords interspersed with primitive dwords that interrupt the proximity and flow of the Data dwords is received by detect module 301. Detect module 301 first looks for an SOF primitive dword (Start of Frame), and then determines if each following dword is a Data dword or a primitive dword.

When an SOF primitive dword is detected by detect module 301, it is placed into frame FIFO 310 and counter 340 is started. Simultaneously, the SOF primitive dword is placed in pass-through FIFO 320. Note that in the SAS operation counter 350 is not used as will be described in more detail to follow.

Each Data dword that is detected by detection module 301 after the SOF dword is also simultaneously placed in frame FIFO 310 and pass-through FIFO 320. As the Data dword is placed in each of the FIFOs, the counter 340 is incremented by one.

In addition, each non-ALIGN/NOTIFY primitive dword detected by detection module 301 is simultaneously placed in the pass-through FIFO 320 and the primitive FIFO 330. The non-ALIGN/NOTIFY primitives may include important information that should ultimately be transmitted between nodes 110, 120 when operation is in the SAS protocol, thus necessitating their collection in FIFO 330. The ALIGN/NOTIFY primitives are only placed in pass-through FIFO 320. As in the SATA operation, the ALIGN/NOTIFY primitives have rate matching and clock retiming functions and should not be altered by frame compaction module 140 in the example embodiment.

This process is continued as Data dwords, non-ALIGN/NOTIFY primitive dwords, and ALIGN/NOTIFY primitive dwords are detected by detection module 301. After 70 dwords, the SOF dword will reach the output of pass-through FIFO 320. At this point, detection module 301 will check to see how many times counter 340 has incremented. If the end of the frame was already detected, meaning that the frame was shorter than 32 Data dwords, or if counter 340 has incremented to 32 counts, which indicates that there are 32 Data dwords in both FIFOs 310 and 320, then the contents of pass-through FIFO 320 are allowed to pass without any modification as represented by frame 315 to comparison module 150. In addition, all dwords received after this time will also be allowed to pass until the data frame is complete and the process begins again. This is because frame 315 will meet the requirement of either ending within 70 dwords of the start of the data frame, or having 32 Data dwords within 70 dwords of the start of the data frame. As mentioned above, this will allow comparison module 150 to interpret frame 315. Frame FIFO 310 and Primitive FIFO 330 are emptied and the counter 340 is reset.

On the other hand, if detect module 301 does not find that counter 340 has incremented to 32, which indicates that there are not 32 Data dwords in the first 70 dwords of the frame, then the contents of pass-through FIFO 320 are not automatically passed. Instead, a primitive dword from primitive FIFO 330 is passed any time a non-ALIGN/NOTIFY dword reaches the output of pass-through FIFO 320. This ensures that all of the non-ALIGN/NOTIFY primitives are passed. As with the SATA case, the ALIGN/NOTIFY primitives are passed when they reach the bottom of pass-through FIFO 320. As explained previously, comparator module 150 does not begin its operation until seeing an SOF dword.

Once detect module 301 detects the end of the frame or determines that counter 340 has incremented to 32 (which indicates that there are 32 Data dwords in frame FIFO 310), the contents of frame FIFO 310 are sent as data frame 315 to comparison module 150, dwords are no longer placed in frame FIFO 310 or primitive FIFO 330, and counter 340 is cleared. This is performed by sending one word out of frame FIFO 310 each time a non-ALIGN/NOTIFY dword is detected at the output of pass-through FIFO 320. All ALIGN/NOTIFY primitives detected -at the bottom of pass-through FIFO 320 are still passed. Once frame FIFO 310 is emptied, primitive FIFO 330 is also emptied of any remaining non-ALIGN/NOTIFY primitive dwords to ensure that all non-ALIGN/NOTIFY primitives are also passed as part of or after data frame 315. This is performed by sending one word out of primitive FIFO 330 each time a non-ALIGN/NOTIFY dword is detected at the output of FIFO 320. All ALIGN/NOTIFY primitives detected at the bottom of pass-through FIFO 320 are still passed. All newer contents of pass-through FIFO 320 and any new dwords received after this point are also passed through to comparison module 150 as part of or after data frame 315, and the counter is reset. This process ensures that the required 32 Data dwords, or less if the frame was shorter than 32 dwords, are received by comparison module 150 within 70 dwords of the start of the frame, thus allowing the comparison module 150 to properly interpret the data frame. The frame compaction operation may then be performed anytime a new SOF is detected by detect module 301.

Example Methods of Frame Compaction

Referring now to FIG. 4, a flowchart of a method 400 for an in-line diagnostic component to reorder or compress network traffic is illustrated. Method 400 will be described in relation to the network system of FIGS. 1, 2 and 3, although this is not required. It will be appreciated that method 400 may be practiced in numerous diagnostic network systems.

Method 400 includes an act of receiving a network data frame from the first node for communication with the second node that includes a plurality of data units interspersed with one or more non-data units that interrupt the proximity and flow of the data units (act 402). For example, network diagnostic component 130, specifically detect module 301, may receive frame 305. As mentioned, frame 305, which may be of the SAS or SATA protocol, may include Data dwords (data units) and one or more primitive dwords (non-data units). The primitive dwords of frame 305 may be interspersed among the Data dwords in a manner that interrupt the proximity and flow of the Data dwords. This interruption of the Data dwords may make it so that comparison module 150 may not properly interpret frame 305.

Method 400 also includes an act of reordering the network data frame by removing or moving at least some of the non-data units that that are interspersed with the plurality of data units (act 404). For example, detect module 301, which may be a state machine in some embodiments, may reorder frame 305 into a frame 315 that is interpretable by comparison module 150. The reordering causes a predetermined number of Data dwords to be placed next to each other with few or no primitive dwords between them, except possibly for primitive Dwords such as ALIGN/NOTIFY that may not be moved or removed. In other words, the network data frame has been reordered by the removal of at least some of the non-ALIGN/NOTIFY primitive dwords from between the predetermined number of Data dwords and any ALIGN/NOTIFY primitive dwords. In some embodiments, the predetermined number of Data dwords is 32, which allows comparison module 150 to compare up to 32 Data dwords deep within the first 70 dwords of frame 315.

Turning now to FIG. 5, a more particular method 500 for reordering the network data frame is illustrated. Method 500 includes an act of placing a predetermined number of data units in a first FIFO buffer (act 502). For example, detect module 301 may place a predetermined number of Data dwords in frame FIFO buffer 310, which may be 32 dwords in depth in some embodiments. As mentioned previously, in some embodiments, the first 32 Data dwords of frame 305 received by detect module 301 may be placed in frame FIFO buffer 310.

Method 500 also includes an act of placing at least the predetermined number of data units and the one or more interspersed non-data units, in a second FIFO buffer (act 504). For example, detect module 301 may place all traffic, including the predetermined number of Data dwords and the primitive dwords of frame 305 into pass-through FIFO buffer 320, which may be 70 dwords in depth in some embodiments. Detect module 301 then continually removes the bottom dword of the pass-through FIFO 320 and either passes it on or replaces it according to the conditions described below, so that the pass-through FIFO 320 is always full and contains a constant number of dwords at all times, which may be 70 dwords in some embodiments.

Method 500 further includes an act of incrementing a counter every time one of the predetermined number of data units is placed in the first FIFO buffer (act 506). For example, counter 340 may begin to count when detect module 301 places an SOF primitive into frame FIFO 310. The counter 340 may then increment any time one of the predetermined number of Data dwords is placed in FIFO 310, which in some embodiments will be the first 32 Data dwords of frame 305.

Method 500 additionally includes an act of replacing with other non-data units the predetermined data units and at least some of the non-data units as they are read from the second FIFO buffer if the counter has not incremented to the predetermined number and the end of the frame has not been detected (act 508),. For example, detect module 301 may replace a Data dword and a non-ALIGN/NOTIFY primitive dword any time one of these dwords reaches the bottom of pass-through FIFO 320 before the end of the frame has been detected and before counter 340 has incremented to the predetermined number, which may be 32 in some embodiments. As previously described, the Data dwords and non-ALIGN/NOTIFY primitive dwords may be replaced by other non-data Dwords such as SATA_X_RDY primitive dwords in some embodiments. The SATA_X_RDY primitive dwords are then passed to comparison module 150 as long as the end of the frame has not been detected and counter 340 has not incremented to 32 by the time that the first frame dword, for example the SOF, reaches the bottom of the second FIFO buffer. As mentioned, ALIGN/NOTIFY primitive dwords are typically passed unaltered or replaced. However, if the end of the frame is detected or if the counter 340 reaches the predetermined number by the time the first frame dword, for example the SOF, reaches the bottom of the pass-through FIFO 320, then the contents of the frame FIFO 310 are cleared, the counters 340 and 350 are cleared, and the traffic continues to pass through pass-through FIFO 320 unaltered while detect module 301 looks for the next frame to restart the process with. In this way, the traffic is not altered whenever a frame is detected that already has its ending or its first 32 data dwords located within 70 dwords starting with the SOF.

Method 500 further includes an act of passing the data units in the first FIFO buffer when the end of the frame is detected or the counter has incremented to the predetermined value, wherein at least some of the non-data units are no longer interspersed with the predetermined number of data units (act 510). For example, detect module 301 may pass the Data dwords placed in frame FIFO 310 as frame 315 to comparison module 150 when the end of the frame is detected or counter 340 reaches the predetermined number such as 32. For instance, detect module 301 passes a Data dword from frame FIFO 310 every time it detects a non-ALIGN/NOTIFY primitive dword at the bottom of pass-through FIFO 320. As mentioned, ALIGN/NOTIFY primitive dwords are typically passed unaltered. In this manner, at least some of the non-ALIGN/NOTIFY primitive dwords are no longer interspersed with the Data dwords passing from frame FIFO 310. Also, at the point when the end of the frame is detected or the counter 340 reaches the predetermined value, counter 340 is no longer incremented, and no further dwords are placed into frame FIFO 310, but all incoming dwords continue to be placed into pass-through FIFO 320.

Method 500 also includes an act of passing the contents of the second FIFO buffer unaltered after passing the predetermined number of data units from the first FIFO buffer (act 512). For example, after all data dwords have been sent from frame FIFO 310, dwords are only passed from pass-through FIFO 320 to comparator 150 until detect module 301 detects another SOF and the process starts again. Accordingly, frame 305 has been reordered as frame 315 in such a way that the data frame can be interpreted by comparison module 150. For instance, in the embodiments described above, the reordering of frame 305 ensures that the end of the frame or the first 32 Data dwords are within the first 70 dwords received by comparison module 150.

Method 500 further includes incrementing a second counter, for example counter 350, every time a data dword or a non-ALIGN/NOTIFY dword is placed in pass-through FIFO 320. Counter 350 then stops incrementing and begins to decrement any time a Data dword or a non-ALIGN/NOTIFY primitive dword is altered after counter 340 has incremented to the predetermined number or the end of the frame has been detected. In such embodiments, detect module 301 continues to replace the Data dwords and the non-ALIGN/NOTIFY primitive dwords coming out of pass-through FIFO 320 and to pass the replaced dwords to comparison module 150 until the counter 350 has decremented to a count that matches the number counted by counter 340. Then all Data dwords are sent from frame FIFO 310, and the counters are reset. In this way, the first dword sent from pass-through FIFO buffer 320 after frame FIFO buffer 310 has been emptied will be whatever dword came directly after the end of the frame or the Data dword 32 in the frame 305.

Figure 6:
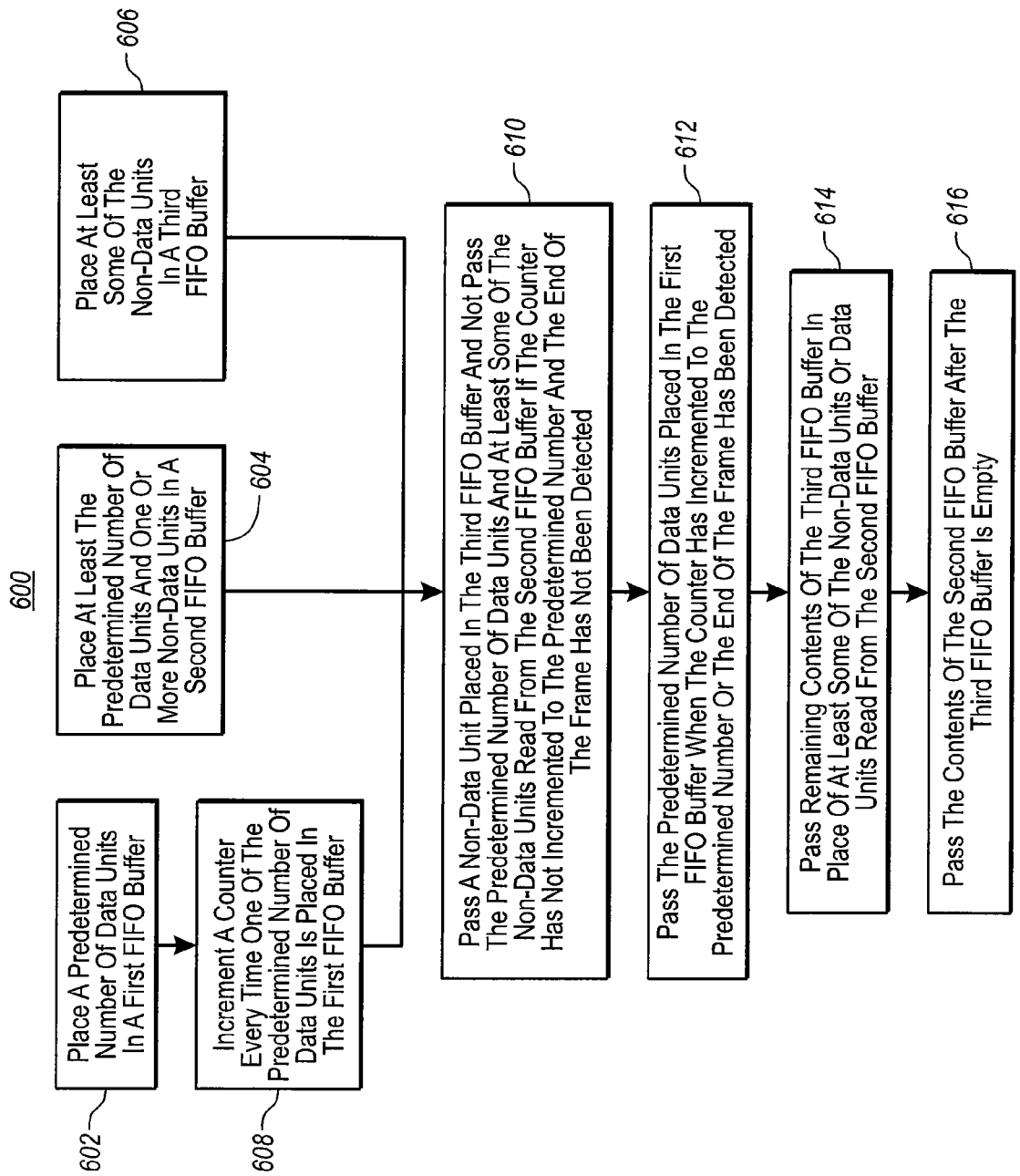
FIG. 6 illustrates an additional specific method for reordering network traffic.

Turning now to FIG. 6, an additional method 600 for reordering the network data frame is illustrated. Method 600 includes an act of placing a predetermined number of the plurality of data units in a first FIFO buffer (act 602). For example, detect module 301 may place a predetermined number of Data dwords in frame FIFO buffer 310, which may be 32 dwords in depth in some embodiments. As mentioned previously, in some embodiments, the first 32 Data dwords of frame 305 received by detect module 301 may be placed in frame FIFO buffer 310.

Method 600 also includes an act of placing at least the predetermined number of data units and the one or more interspersed non-data units, in a second FIFO buffer (act 604). For example, detect module 301 may place all traffic, including the predetermined number of Data dwords and the primitive dwords of frame 305 into pass-through FIFO buffer 320, which may be 70 dwords in depth in some embodiments. Detect module 301 then continually removes the bottom dword of the pass-through FIFO 320 and either passes it on or discards it according to the conditions described below, so that the pass-through FIFO 320 is always full and contains a constant number of dwords at all times, which may be 70 dwords in some embodiments.

Method 600 further includes an act of placing at least some of the non-data units in a third FIFO buffer (act 606). For example, detect module 301 may place the non-ALIGN/NOTIFY primitive dwords of frame 305 into primitive FIFO buffer 330, which may be 70 dwords in depth in some embodiments.

Method 600 additionally includes an act of incrementing a counter every time one of the predetermined number of data units is placed in the first FIFO buffer (act 608). For example, counter 340 may begin to count when detect module 301 places an SOF primitive into frame FIFO 310. The counter 340 may then increment any time one of the predetermined number of Data dwords is placed in FIFO 310, which in some embodiments will be the first 32 Data dwords of frame 305.

Method 600 further includes an act of passing a non-data unit placed in the third FIFO and not passing the predetermined number of data units and at least some of the non-data units read from the second FIFO buffer if the end of the frame has not been detected and the counter has not incremented to the predetermined number (act 610). For example, detect module 301 may pass one of the non-ALIGN/NOTIFY primitive dwords placed in primitive FIFO buffer 330 any time a Data dword or a non-ALIGN/NOTIFY primitive dword reaches the bottom of pass-through FIFO 320 before the end of the frame has been detected and counter 340 has incremented to the predetermined number, which may be 32 in some embodiments. Note that ALIGN/NOTIFY primitive dwords are passed when they reach the bottom of pass-through FIFO 320. However, if the end of the frame is detected or the counter 340 reaches the predetermined number by the time the first frame dword, for example the SOF, reaches the bottom of the pass-through FIFO 320, then the contents of the frame FIFO 310 and the primitive FIFO 330 are cleared, the counter 340 is cleared, and the traffic continues to pass through the pass-through FIFO 320 unaltered while detect module 301 looks for the next frame to restart the process with. In this way, the traffic is not altered whenever a frame is detected that already has its ending or its first 32 data dwords located within 70 dwords starting with the SOF.

Method 600 also includes the act of passing the data units in the first FIFO buffer when the end of the frame has been detected or the counter has incremented to the predetermined value, the data units being passed from the first FIFO buffer with fewer or no non-data units interspersed between them (act 612). For example, detect module 301 may pass the Data dwords placed in frame FIFO 310 as frame 315 to comparison module 150 when the end of the frame is detected or counter 340 reaches the predetermined number such as 32. For instance, detect module 301 passes a Data dword from frame FIFO 310 every time it detects a non-ALIGN/NOTIFY primitive dword at the bottom of pass-through FIFO 320. As mentioned, ALIGN/NOTIFY primitive dwords are typically passed unaltered. In this manner, the data units are passed from frame FIFO 310 with fewer or no primitive dwords interspersed between them as the non-ALIGN/NOTIFY primitive dwords have been moved to other portions of the data frame or after the data frame. Also, at the point when the end of the frame is detected or the counter 340 reaches the predetermined value, no further dwords are placed into frame FIFO 310, but all incoming dwords continue to be placed into pass-through FIFO 320.

Method 600 further includes the acts of passing any remaining contents of the third FIFO buffer in place of at least some of the data or non-data units read from the second FIFO buffer (act 614), resetting the counter 340, and passing the contents of the second FIFO buffer after the third FIFO buffer is empty (act 616). For example, after all data dwords have been sent from frame FIFO 310, the contents of primitive FIFO 330 are then sent in place of each non-ALIGN/NOTIFY dword at the bottom of pass-through FIFO 320, until primitive FIFO 330 is empty. At this point dwords are only passed from pass-through FIFO 320 to comparator 150 until detect module 301 detects another SOF and the process starts again. Accordingly, frame 305 has been reordered as frame 315 in such a way that the data frame can be interpreted by comparison module 150. For instance, in the embodiments described above, the reordering of frame 305 ensures that the end of the frame or the first 32 Data dwords are within the first 70 dwords received by comparison module 150 starting with the SOF.

In some embodiments, frame compaction module 300 or another portion of network diagnostic component 130 may also include an enable module 302. Enable module 302 may be software, hardware, or any combination of the two. Although enable module 302 is illustrated as being a stand alone module, in some embodiments enable module 302 may be part of another module or component of frame compaction module 300 or another portion of network diagnostic component 130. In operation, enable module allows for the enablement or non-enablement of frame compaction on the fly. For example, in some embodiments network diagnostic component 130 is configured to operate on both the SAS and SATA protocols. Enable module 302 may enable frame compaction in SAS, SATA, in both SAS and SATA or in neither SAS and SATA. In this way if network diagnostic component 130 is set only to look for and operate on a SAS frame, enable module 302 may have the "SATA enable" turned off, so that if a SATA frame comes along, network diagnostic component 130 ignores it even if the first 32 data words are not proximate. In another example, enable module 302 may cause both enables to be turned off if the network diagnostic component 130 is currently looking for a non-data word and not a frame at all. This feature further reduces the number of times that network diagnostic component 130 alters the traffic when it is not absolutely necessary.

Example Network Diagnostic Functions

As mentioned above, the network diagnostic component 130 may perform a variety of network diagnostic functions. The network diagnostic component 130 may be configured to function as any combination of: a bit error rate tester, a protocol analyzer, a generator, a jammer, a monitor, and any other appropriate network diagnostic device.

Bit Error Rate Tester

In some embodiments, the network diagnostic component 130 may function as a bit error rate tester. The bit error rate tester may generate and/or transmit an initial version of a bit sequence via a communication path. If desired, the initial version of the bit sequence may be user selected. The bit error rate tester may also receive a received version of the bit sequence via a communication path.

The bit error rate tester compares the received version of the bit sequence (or at least a portion of the received version) with the initial version of the bit sequence (or at least a portion of the initial version). In performing this comparison, the bit error rate test may determine whether the received version of the bit sequence (or at least a portion of the received version) matches and/or does not match the initial version of the bit sequence (or at least a portion of the initial version). The bit error tester may thus determine any differences between the compared bit sequences and may generate statistics at least partially derived from those differences. Examples of such statistics may include, but are not limited to, the total number of errors (such as, bits that did not match or lost bits), a bit error rate, and the like.

It will be appreciated that a particular protocol specification may require a bit error rate to be less than a specific value. Thus, a manufacturer of physical communication components and connections (such as, optical cables), communication chips, and the like may use the bit error rate tester to determine whether their components comply with a protocol-specified bit error rate. Also, when communication components are deployed, the bit error tester may be used to identify defects in a deployed physical communication path, which then may be physically inspected.

Protocol Analyzer

In some embodiments, the network diagnostic component 130 may function as a protocol analyzer (or network analyzer), which may be used to capture data or a bit sequence for further analysis. The analysis of the captured data may, for example, diagnose data transmission faults, data transmission errors, performance errors (known generally as problem conditions), and/or other conditions.

As described below, the protocol analyzer may be configured to receive a bit sequence via one or more communication paths or channels. Typically, the bit sequence comprises one or more network messages, such as, packets, frames, or other protocol-adapted network messages. Preferably, the protocol analyzer may passively receive the network messages via passive network connections.

The protocol analyzer may be configured to compare the received bit sequence (or at least a portion thereof) with one or more bit sequences or patterns. Before performing this comparison, the protocol analyzer may optionally apply one or more bit masks to the received bit sequence. In performing this comparison, the protocol analyzer may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence that comprises a network message having particular characteristics—such as, for example, having an unusual network address, having a code violation or character error, having an unusual timestamp, having an incorrect CRC value, indicating a link re-initialization, and/or having a variety of other characteristics.

The protocol analyzer may detect a network message having any specified characteristics, which specified characteristics may be user-selected via user input. It will be appreciated that a specified characteristic could be the presence of an attribute or the lack of an attribute. Also, it will be appreciated that the network analyzer may detect a network message having particular characteristics using any other suitable method.

In response to detecting a network message having a set of one or more characteristics, the network analyzer may execute a capture of a bit sequence—which bit sequence may comprise network messages and/or portions of network messages. For example, in one embodiment, when the network analyzer receives a new network message, the network analyzer may buffer, cache, or otherwise store a series of network messages in a circular buffer. Once the circular buffer is filled, the network analyzer may overwrite (or otherwise replace) the oldest network message in the buffer with the newly received network message or messages. When the network analyzer receives a new network message, the network analyzer may detect whether the network message has a set of one or more specified characteristics. In response to detecting that the received network message has the one or more specified characteristics, the network analyzer may execute a capture (1) by ceasing to overwrite the buffer (thus capturing one or more network messages prior to detected message), (2) by overwriting at least a portion or percentage of the buffer with one or more newly received messages (thus capturing at least one network message prior to the detected message and at least one network message after the detected message), or (3) by overwriting the entire buffer (thus capturing one or more network messages after the detected message). In one embodiment, a user may specify via user input a percentage of the buffer to store messages before the detected message, a percentage of the buffer to store messages after the detected message, or both. In one embodiment, a protocol analyzer may convert a captured bit stream into another format.

In response to detecting a network message having a set of one or more characteristics, a network analyzer may generate a trigger adapted to initiate a capture of a bit sequence. Also, in response to receiving a trigger adapted to initiate a capture of a bit sequence, a network analyzer may execute a capture of a bit sequence. For example, the network analyzer may be configured to send and/or receive a trigger signal among a plurality of network analyzers. In response to detecting that a received network message has the one or more specified characteristics, a network analyzer may execute a capture and/or send a trigger signal to one or more network analyzers that are configured to execute a capture in response to receiving such a trigger signal. Further embodiments illustrating trigger signals and other capture systems are described in U.S. patent application Ser. No. 10/881,620 filed Jun. 30, 2004 and entitled PROPAGATION OF SIGNALS BETWEEN DEVICES FOR TRIGGERING CAPTURE OF NETWORK DATA, which is hereby incorporated by reference herein in its entirety.

It will be appreciated that a capture may be triggered in response to detecting any particular circumstance—whether matching a bit sequence and bit pattern, receiving an external trigger signal, detecting a state (such as, when a protocol analyzer's buffer is filled), detecting an event, detecting a multi-network-message event, detecting the absence of an event, detecting user input, or any other suitable circumstance.

The protocol analyzer may optionally be configured to filter network messages (for example, network messages having or lacking particular characteristics), such as, messages from a particular node, messages to a particular node, messages between or among a plurality of particular nodes, network messages of a particular format or type, messages having a particular type of error, and the like. Accordingly, using one or more bit masks, bit patterns, and the like, the protocol analyzer may be used identify network messages having particular characteristics and determine whether to store or to discard those network messages based at least in part upon those particular characteristics.

The protocol analyzer may optionally be configured to capture a portion of a network message. For example, the protocol analyzer may be configured to store at least a portion of a header portion of a network message, but discard at least a portion of a data payload. Thus, the protocol analyzer may be configured to capture and to discard any suitable portions of a network message.

It will be appreciated that a particular protocol specification may require network messages to have particular characteristics. Thus, a manufacturer of network nodes and the like may use the protocol analyzer to determine whether their goods comply with a protocol. Also, when nodes are deployed, the protocol analyzer may be used to identify defects in a deployed node or in other portions of a deployed network.

Generator

In some embodiments, the network diagnostic component 130 may function as a generator. The generator may generate and/or transmit a bit sequence via one or more communication paths or channels. Typically, the bit sequence comprises network messages, such as, packets, frames, or other protocol-adapted network messages. The network messages may comprise simulated network traffic between nodes on a network. In one embodiment, the bit sequence may be a predefined sequence of messages. Advantageously, a network administrator may evaluate how the nodes (and/or other nodes on the network) respond to the simulated network traffic. Thus, the network administrator may be able to identify performance deviations and take appropriate measures to help avoid future performance deviations.

In one embodiment, the generator may execute a script to generate the simulated network traffic. The script may allow the generator to dynamically simulate network traffic by functioning as a state machine or in any other suitable manner. For example, a script might include one or more elements like the following: "In state X, if network message A is received, transmit network message B and move to state Y." The generator may advantageously recognize network messages (and any characteristics thereof) in any other suitable manner, including but not limited to how a protocol analyzer may recognize network messages (and any characteristics thereof). The script may also include a time delay instructing the generator to wait an indicated amount of time after receiving a message before transmitting a message in response. In response to receiving a message, a generator may transmit a response message that is completely predefined. However, in response to receiving a message, a generator may transmit a response message that is not completely predefined, for example, a response message that includes some data or other portion of the received message.

Jammer

In some embodiments, the network diagnostic component 130 may function as a jammer. The jammer may receive, generate, and/or transmit one or more bit sequences via one or more communication paths or channels. Typically, the bit sequences comprise network messages (such as, packets, frames, or other protocol-adapted network messages) comprising network traffic between nodes on a network. The jammer may be configured as an inline component of the network such that the jammer may receive and retransmit (or otherwise forward) network messages.

Prior to retransmitting the received network messages, the jammer may selectively alter at least a portion of the network traffic, which alterations may introduce protocol errors or other types of errors.

By altering at least a portion of the network traffic, the jammer may generate traffic, which traffic may be used to test a network. For example, a network administrator may then evaluate how the nodes on the network respond to these errors. For example, a network system designer can perform any one of a number of different diagnostic tests to make determinations such as whether a system responded appropriately to incomplete, misplaced, or missing tasks or sequences; how misdirected or confusing frames are treated; and/or how misplaced ordered sets are treated. In some embodiments, the network diagnostic component 130 may include any suitable jamming (or other network diagnostic system or method) disclosed in U.S. Pat. No. 6,268,808 B1 to Iryami et al., entitled HIGH SPEED DATA MODIFICATION SYSTEM AND METHOD, which is hereby incorporated by reference herein in its entirety.

In one embodiment, to determine which network messages to alter, the jammer may be configured to compare a received bit sequence—such as a network message—(or a portion of the received bit sequence) with one or more bit sequences or patterns. Before performing this comparison, the jammer may optionally apply one or more bit masks to the received bit sequence. In performing this comparison, the jammer may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence (or portion thereof) when the received bit sequence comprises a network message from a particular node, a message to a particular node, a network message between or among a plurality of particular nodes, a network message of a particular format or type, and the like. Accordingly, the jammer may be configured to detect a network message having any specified characteristics. Upon detection of the network message having the specified characteristics, the jammer may alter the network message and/or one or more network messages following the network message.

Monitor

In some embodiments, the network diagnostic component 130 may function as a monitor, which may be used to derive statistics from one or more network messages having particular characteristics, one or more conversations having particular characteristics, and the like.

As described below, the monitor may be configured to receive a bit sequence via one or more communication paths or channels. Typically, the monitor passively receives the network messages via one or more passive network connections.

To determine the network messages and/or the conversations from which statistics should be derived, the monitor may be configured to compare a received bit sequence—such as a network message—(or a portion of the received bit sequence) with one or more bit sequences or patterns. Before performing this comparison, the monitor may optionally apply one or more bit masks to the received bit sequence. In performing this comparison, the monitor may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence (or portion thereof) when the received bit sequence comprises a network message from a particular node, a network message to a particular node, a network message between or among a plurality of particular nodes, a network message of a particular format or type, a network message having a particular error, and the like. Accordingly, the monitor may be configured to detect a network message having any specified characteristics—including but not limited to whether the network message is associated with a particular conversation among nodes.

Upon detecting a network message having specified characteristics, the monitor may create and update table entries to maintain statistics for individual network messages and/or for conversations comprising packets between nodes. For example, a monitor may count the number of physical errors (such as, bit transmission errors, CRC errors, and the like), protocol errors (such as, timeouts, missing network messages, retries, out of orders), other error conditions, protocol events (such as, an abort, a buffer-is-full message), and the like. Also, as an example, the monitor may create conversation-specific statistics, such as, the number of packets exchanged in a conversation, the response times associated with the packets exchanged in a conversation, transaction latency, block transfer size, transfer completion status, aggregate throughput, and the like. It will be appreciated that a specified characteristic could be the presence of an attribute or the lack of an attribute.

In some embodiments, the network diagnostic component 130 may include any features and/or perform any method described in U.S. patent application Ser. No. 10/769,202, entitled MULTI-PURPOSE NETWORK DIAGNOSTIC MODULES and filed on Jan. 30, 2004, which is hereby incorporated by reference herein in its entirety.

Example Systems

It will be appreciated that the network diagnostic component 130 may be used to implement a variety of systems.

In one embodiment, the network diagnostic component 130 may comprise a printed circuit board. The printed circuit board may include a CPU module.

In one embodiment, the network diagnostic component 130 may comprise a blade. The blade may include a printed circuit board, an interface, or any combination thereof.

In one embodiment, the network diagnostic component 130 may comprise a chassis computing system. The chassis computing system may include one or more CPU modules, which may be adapted to interface with one, two, or more blades or other printed circuit boards. For example, a blade may have an interface though which a diagnostic module may send network diagnostic data to a CPU module of the chassis computing system. The chassis computer system may be adapted to receive one or more printed circuit boards or blades.

A CPU module may transmit the network diagnostic data it receives to a local storage device, a remote storage device, or any other suitable system for retrieval and/or further analysis of the diagnostic data. A client software program may retrieve, access, and/or manipulate the diagnostic data for any suitable purpose. Examples of systems and methods for storing and retrieving network diagnostic data include, but are not limited to, those described in U.S. patent application Ser. No. 10/307,272, entitled A SYSTEM AND METHOD FOR NETWORK TRAFFIC AND I/O TRANSACTION MONITORING OF A HIGH SPEED COMMUNICATIONS NET- WORK and filed Nov. 27, 2002, which is hereby incorporated by reference herein in its entirety.

In one embodiment, the network diagnostic component 130 may comprise an appliance. Depending on the particular configuration, the appliance may include any suitable combination of one or more CPU modules and one or more diagnostic modules. In one embodiment, an appliance may include and/or be in communication with one or more storage devices, which may advantageously be used for storing any suitable diagnostic data, statistics, and the like. In one embodiment, an appliance may include and/or be in communication with one or more client interface modules, which may advantageously be used for displaying information to a user, receiving user input from a client software program, or sending information to a client software program. The appliance may also include and/or be in communication with one or more display devices (such as, a monitor) adapted to display information, one or more user input devices (such as, a keyboard, a mouse, a touch screen, and the like) adapted to receive user input, or both.

It will be appreciated that the network diagnostic component 130 may comprise any of a variety of other suitable network diagnostic components.

Example Operating and Computing Environments

The methods and systems described above can be implemented using software, hardware, or both hardware and software. For example, the software may advantageously be configured to reside on an addressable storage medium and be configured to execute on one or more processors. Thus, software, hardware, or both may include, by way of example, any suitable module, such as software components, object-oriented software components, class components and task components, processes, functions, attributes, procedures, subroutines, segments of program code, drivers, firmware, microcode, circuitry, data, databases, data structures, tables, arrays, variables, field programmable gate arrays ("FPGA"), a field programmable logic arrays ("FPLAs"), a programmable logic array ("PLAs"), any programmable logic device, application-specific integrated circuits ("ASICs"), controllers, computers, and firmware to implement those methods and systems described above. The functionality provided for in the software, hardware, or both may be combined into fewer components or further separated into additional components. Additionally, the components may advantageously be implemented to execute on one or more computing devices. As used herein, "computing device" is a broad term and is used in its ordinary meaning and includes, but is not limited to, devices such as, personal computers, desktop computers, laptop computers, palmtop computers, a general purpose computer, a special purpose computer, mobile telephones, personal digital assistants (PDAs), Internet terminals, multi-processor systems, hand-held computing devices, portable computing devices, microprocessor-based consumer electronics, programmable consumer electronics, network PCs, minicomputers, mainframe computers, computing devices that may generate data, computing devices that may have the need for storing data, and the like.

Also, one or more software modules, one or more hardware modules, or both may comprise a means for performing some or all of any of the methods described herein. Further, one or more software modules, one or more hardware modules, or both may comprise a means for implementing any other functionality or features described herein.

Embodiments within the scope of the present invention also include computer-readable media for carrying or having computer-executable instructions or data structures stored thereon. Such computer-readable media can be any available media that can be accessed by a computing device. By way of example, and not limitation, such computer-readable media can comprise any storage device or any other medium which can be used to carry or store desired program code means in the form of computer-executable instructions or data structures and which can be accessed by a computing device.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a computing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for a network diagnostic component that is placed in-line between first and second nodes in a network to reorder network traffic, the method comprising:

an act of receiving a network data frame from the first node for communication with the second node, the network data frame including a plurality of data units interspersed with one or more non-data units that interrupt the proximity and flow of the data units; and an act of reordering the network data frame by removing or moving at least some of the non-data units that are interspersed with the plurality of data units, wherein the network diagnostic component includes a first and a second First In, First Out (FIFO) buffer and at least one counter, the act of reordering the network data frame comprising:

an act of placing a predetermined number of the plurality of data units in the first FIFO buffer;

an act of placing at least the predetermined number of the data units and the one or more interspersed non-data units in the second FIFO buffer;

an act of incrementing the counter every time one of the predetermined number of data units is placed in the first FIFO buffer;

an act of replacing with other non-data units the predetermined number of data units and at least some of the non-data units as they are read from the second FIFO buffer if the counter has not incremented to the predetermined number and the end of the frame has not been detected;

an act of passing the data units placed in the first FIFO buffer when the counter has incremented to the predetermined number or the end of the frame has been detected, wherein at least some of the non-data units are no longer interspersed with the predetermined number of data units; and an act of passing the contents of the second FIFO buffer unaltered after passing the data units from the first FIFO buffer.

2. The method in accordance with claim 1, wherein the network diagnostic component further includes a second counter, the method further comprising:

an act of incrementing the second counter when the predetermined number of data units and at least some of the non-data units are placed in the second FIFO buffer;

an act of beginning to decrement the second counter when replacing a data unit or non-data unit placed in the second FIFO buffer after the first counter has reached the predetermined number or the end of the frame has been detected; and an act of continuing to replace with other non-data units the predetermined data units and at least some of the non-data units read from the second FIFO buffer until the second counter has decremented to a count that matches the number counted by the first counter.

3. The method in accordance with claim 1, wherein ALIGN and NOTIFY non-data units are not replaced or altered when being passed from the second FIFO buffer.

4. The method in accordance with claim 1, wherein the network data frame is of the Serial Advanced Technology Attachment (SATA) protocol.

5. A method for a network diagnostic component that is placed in-line between first and second nodes in a network to reorder network traffic, the method comprising:

an act of receiving a network data frame from the first node for communication with the second node, the network data frame including a plurality of data units interspersed with one or more non-data units that interrupt the proximity and flow of the data units; and an act of reordering the network data frame by removing or moving at least some of the non-data units that are interspersed with the plurality of data units, wherein the network diagnostic component includes a first, a second, and a third First In, First Out (FIFO) buffer and at least one counter, the act of reordering the network data frame comprising:

an act of placing a predetermined number of the plurality of data units in the first FIFO buffer;

an act of placing at least the predetermined number of the data units and the one or more interspersed non-data units in the second FIFO buffer;

an act of placing at least some of the non-data units in the third FIFO buffer;

an act of incrementing the counter every time one of the predetermined number of data units is placed in the first FIFO buffer;

an act of passing a non-data unit placed in the third FIFO and not passing the predetermined number of data units and at least some of the non-data units read from the second FIFO buffer if the counter has not incremented to the predetermined number and the end of the frame has not been detected;

an act of passing the predetermined number of data units placed in the first FIFO buffer when the counter has incremented to the predetermined number or the end of the frame has been detected, wherein the data units are passed from the first FIFO buffer with fewer or no non-data units interspersed between them;

an act of passing any remaining contents of the third FIFO buffer in place of at least some of the non-data units or data units read from the second FIFO buffer; and an act of passing the contents of the second FIFO buffer after the third FIFO buffer is empty.

6. The method in accordance with claim 5, wherein the network data frame is of the Serial Attached SCSI (SAS) protocol.

7. The method in accordance with claim 5, wherein ALIGN and NOTIFY non-data units are passed from the second FIFO buffer without being replaced or altered.

8. A network diagnostic device placed in-line between first and second nodes in a network, comprising a first module configured to receive a network data frame from the first node for communication with the second node, the network data frame including a plurality of data units interspersed with one or more non-data units that interrupt the proximity and flow of the data units, wherein the first module is further configured to reorder the network data frame by removing or moving at least some of the non-data units that are interspersed with the plurality of data units, the first module comprising:

a first First In, First Out (FIFO) buffer configured to have the first module place a predetermined number of the plurality of data units in it;

a second FIFO buffer configured to have the first module place the predetermined number of data units and the interspersed one or more non-data units in it; and a first counter configured to increment when the first module places a data unit in the first FIFO buffer;

wherein the first module is configured to replace with other non-data units the predetermined data units and at least some of the non-data units as they are read from the second FIFO buffer if the counter has not incremented to the predetermined number and the end of the frame has not been detected;

wherein the first module is further configured to pass the data units placed in the first FIFO buffer when the counter has incremented to the predetermined number or the end of the frame is detected, wherein at least some of the non-data units are no longer interspersed with the predetermined number of data units; and wherein the first module is further configured to pass the contents of the second FIFO buffer unaltered after passing the data units from the first FIFO buffer.

9. The network diagnostic device in accordance with claim 8, further comprising a second counter configured to increment when the first module places the predetermined number of data units and at least some of the non-data units in the second buffer and to begin to decrement when the first counter increments to the predetermined number or the end of the frame is detected;

wherein the first module is configured to continue to replace with other non-data units the predetermined data units and at least some of the non-data units read from the second FIFO buffer until the second counter has decremented to a count that matches the number counted by the first counter.

10. The network diagnostic device in accordance with claim 8, wherein the first FIFO buffer has a depth of 32 dwords and the second FIFO has a depth of 70 dwords.

11. A network diagnostic device placed in-line between first and second nodes in a network, comprising a first module configured to receive a network data frame from the first node for communication with the second node, the network data frame including a plurality of data units interspersed with one or more non-data units that interrupt the proximity and flow of the data units, wherein the first module is further configured to reorder the network data frame by removing or moving at least some of the non-data units that are interspersed with the plurality of data units, so that a first pre-determined number of data units of the plurality of the data units are disposed within a start portion of the reordered network data frame, the start portion having a pre-defined size, whereby the reordered data frame is interpretable by the network diagnostic component, wherein the first module comprises:
- a first First In, First Out (FIFO) buffer configured to have the first module place the predetermined number of data units in it;
- a second FIFO buffer configured to have the first module place the predetermined number of data units and the one or more non-data units in it; and
- a third FIFO buffer configured to have the first module place all non-ALIGN/NOTIFY non-data units in it;
- a first counter configured to increment when the first module places a data unit in the first FIFO buffer;
- wherein the first module is configured to pass a non-data unit placed in the third FIFO buffer and not pass the predetermined number of data units and non-ALIGN/NOTIFY non-data units in the second FIFO buffer if the counter has not incremented to the predetermined number and the end of the frame has not been detected;
- wherein the first module is further configured to pass the predetermined number of data units placed in the first FIFO buffer when the counter has incremented to the predetermined number or the end of the frame has been detected, wherein the data units are passed from the first FIFO buffer with fewer or no non-data units interspersed between them; and
- wherein the first module is further configured to pass any remaining contents of the third FIFO buffer in place of at least some of the non-data units and data units read from the second FIFO buffer and to pass the contents of the second FIFO buffer after the third FIFO buffer is empty.

12. The network diagnostic device in accordance with claim 11, wherein the first FIFO buffer has a depth of 32 dwords, the second FIFO has a depth of 70 dwords, and the third FIFO has a depth of 70 dwords.

* * * * *